US009076560B2

(12) United States Patent
Mori et al.

(10) Patent No.: US 9,076,560 B2
(45) Date of Patent: Jul. 7, 2015

(54) BOLT FIXING DEVICE OF JET PUMP BEAM (75) Inventors: Hajime Mori, Yokohama (JP); Kunihiko Kinugasa, Yokohama (JP); Yuusuke Watanabe, Tokyo (JP); Jun Suzuki, Yokohama (JP); Yoshiki Ishizaki, Yokohama (JP); Yasuo Morishima, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/495,460

(22) Filed: Jun. 13, 2012

(65) Prior Publication Data
US 2012/0307958 A1    Dec. 6, 2012

Related U.S. Application Data (63) Continuation of application No. 12/498,717, filed on Jul. 7, 2009, now abandoned.

(30) Foreign Application Priority Data

Jul. 7, 2008 (JP) .................................. 2008-177148

(51) Int. Cl.
G21C 15/00 (2006.01)
G21C 15/25 (2006.01)
F16B 39/02 (2006.01)

(52) U.S. Cl.
CPC .............. *G21C 15/25* (2013.01); *F16B 39/02* (2013.01); *G21Y 2002/202* (2013.01); *G21Y 2002/302* (2013.01); *G21Y 2002/402* (2013.01); *G21Y 2004/301* (2013.01); *G21Y 2004/504* (2013.01); *Y02E 30/40* (2013.01)

(58) Field of Classification Search
CPC ..................... G21C 15/00; G21C 15/24–15/25
USPC .......................................... 376/372, 461, 463
See application file for complete search history.

(56) References Cited

U.S. PATENT DOCUMENTS

| 3,389,735 A | | 6/1968 | Katz |
| 3,796,397 A | * | 3/1974 | Alberti ............................ 410/79 |
| 5,515,407 A | | 5/1996 | Bevilacqua et al. |
| 5,752,807 A | | 5/1998 | Erbes |
| 5,978,433 A | | 11/1999 | Erbes et al. |

(Continued)

FOREIGN PATENT DOCUMENTS

| GB | 23889 | | 0/1911 |
| GB | 127799 | | 6/1919 |
| GB | 871151 | * | 6/1961 |

(Continued)

*Primary Examiner* — Jack W Keith
*Assistant Examiner* — Marshall O'Connor
(74) *Attorney, Agent, or Firm* — Oblon, McClelland, Maier & Neustadt, L.L.P.

(57) ABSTRACT

A jet pump including a riser as a coolant supply tube, an inlet mixer forming a turn-around path for the coolant, a diffuser, and a jet pump beam provided with a bolt fixing device is disclosed. The bolt fixing device includes: a head bolt of a jet pump beam for pushing and supporting the inlet mixer from an upper side of the riser, the head bolt being provided with a polygonal head portion; a lock cap provided on the polygonal head portion of the head bolt; a body housing disposed on an upper surface of the jet pump beam and adapted to accommodate the lock pin; a plurality of tapered external teeth formed on an outer peripheral side surface of the lock cap; and a plurality of internal tooth-shaped grooves formed to the body housing to fix the head bolt of the jet pump beam.

8 Claims, 5 Drawing Sheets

(56) References Cited

U.S. PATENT DOCUMENTS

| | | |
|---|---|---|
| 6,394,765 B1 | 5/2002 | Erbes et al. |
| 6,434,208 B1 * | 8/2002 | Erbes et al. ............ 376/260 |
| 2002/0114421 A1 | 8/2002 | Erbes et al. |
| 2007/0274855 A1 * | 11/2007 | Nilsson et al. ............ 420/38 |

FOREIGN PATENT DOCUMENTS

| | | |
|---|---|---|
| JP | 2002-277583 | 9/2002 |
| JP | 2005-233864 | 9/2005 |
| JP | 2005-351338 | 12/2005 |
| WO | WO 89/08207 | 9/1989 |

* cited by examiner

BOLT FIXING DEVICE OF JET PUMP BEAM

CROSS-REFERENCE OF RELATED APPLICATIONS

This application is a continuation of application Ser. No. 12/498,717, filed Jul. 7, 2009, the entire content of which is incorporated herein by reference. U.S. application Ser. No. 12/498,717 claims the benefit of priority under 35 U.S.C. §119 to Japanese Application 2008-177148 filed Jul. 7, 2007.

BACKGROUND OF THE INVENTION

1. Field of the Invention

The present invention relates to a technique for handling a jet pump located in a downcomer portion of a boiling water reactor, and in particular, to a bolt fixing device of a jet pump beam capable of performing attaching/detaching operations of a jet pump inlet mixer simply and in a short time.

2. Description of the Related Art

A boiling water reactor includes an external circulation system for forcing a coolant into a reactor core, and a jet pump connected to the external circulation system is provided in a reactor pressure vessel. A plurality of sets of jet pumps are provided in an annular downcomer portion between the reactor pressure vessel and a core shroud.

The jet pump, as described in Patent Document 1 (Japanese Patent Laid-Open Publication No. 2005-233864), is provided for the downcomer portion in the reactor pressure vessel and mainly includes a riser, a diffuser and an inlet mixer. The jet pump is installed in order of the riser, the diffuser and the inlet mixer when located in the reactor pressure vessel.

Installation of the inlet mixer is performed as follows.

First, a lower end of the inlet mixer is passed through a riser bracket which is installed on a pipe side of the riser, a nozzle side portion of the inlet mixer formed with a turn-around path is inserted into an opening of the top portion of the diffuser, a seat surface of an elbow of the inlet mixer is placed on the top portion of the riser, a head bolt of a jet pump beam for installation of the inlet mixer is tightened, and the inlet mixer is located on an upper portion of the riser.

The inlet mixer is tightened and installed to the top of the riser by means of head bolt with the jet pump beam, and thereafter, rotation preventing operation of the head bolt screwed into the jet pump beam should be performed.

For this reason, in the bolt fixing device of a conventional jet pump beam, the head bolt of the jet pump beam attached to the top of the inlet mixer is screwed for tightening, and after fixing the inlet mixer to the top of the riser, a keeper, an inside of which has the same hexagonal face as that of a hexagon bolt head of the upper portion of the head bolt, is placed through the head bolt and is then firmly attached to a plate of the upper surface of the jet pump beam. Then, after being firmly attached to the plate, the keeper and the plate are welded together through a welding operation so as to prevent the rotation of the head bolt.

In the bolt fixing device of the conventional jet pump beam as mentioned above, it is necessary to release the rotation prevention structure of the head bolt and weld the keeper to the plate for preventing the rotation of the head bolt again in every detaching and reinstalling operation of the inlet mixer from the jet pump. In addition, for the attaching/detaching operations of the inlet mixer, a welding working is to be performed by an underwater remote operation having inferior working conditions, so that a considerably long working time is required, thus making it difficult and complicated to perform the attaching/detaching handling operations of the inlet mixer.

SUMMARY OF THE INVENTION

The present invention has been made in view of the above circumstance encountered in the prior art mentioned above, and an object of the present invention is to provide a bolt fixing device of a jet pump beam capable of effectively perform attaching/detaching operations for attaching/detaching an inlet mixer of a jet pump without any welding operation or working, and fixing of a head bolt simply and in a short time.

Another object of the present invention is to provide a bolt fixing device of a jet pump beam capable of preventing rotation of the head bolt of the jet pump beam in a simple manner and easily releasing the rotation prevention structure at a time when the inlet mixer is reinstalled.

These and other objects can be achieved according to the present invention by providing a bolt fixing device of a jet pump beam of a jet pump provided with a riser as a coolant supply tube, an inlet mixer forming a turn-around path for the coolant and a diffuser, the bolt fixing device comprising:

a head bolt of a jet pump beam for pushing and supporting the inlet mixer from an upper side of the riser, the head bolt being provided with a polygonal head portion;

a lock cap provided on the polygonal head portion of the head bolt to be slidable in an axial direction thereof and integrally rotatable;

a body housing disposed on an upper surface of the jet pump beam and adapted to accommodate the lock pin;

a plurality of tapered external teeth formed on an outer peripheral side surface of the lock cap; and a plurality of internal tooth-shaped grooves formed to the body housing so as to be selectively engaged with the external teeth of the lock cap so as to fix the head bolt of the jet pump beam.

In a preferred embodiment, the following modes may be provided.

The bolt fixing device of the jet pump beam may further include an elastic member interposed between the upper surface of the jet pump beam and the lock cap and adapted to urge the external teeth of the lock cap always upwardly so as to be engaged with the internal tooth-shaped grooves of the body housing. The elastic member may be a compression spring or a leaf spring.

The body housing may be provided with an outer peripheral flange at a lower portion thereof, the outer peripheral flange being fixed to an upper surface of the jet pump beam by a base plate having an inner peripheral flange, and the body housing includes a rotation restraint mechanism mounted to the base plate.

The rotation restraint mechanism of the body housing includes a restraint spring disposed in a recessed portion of the base plate and a housing opening opened in an outer side surface of the body housing so as to be engageable with the restraint spring, and rotation of the body housing is restrained at an arbitrary position within a pitch angle range of the housing opening.

The restraint spring of the rotation restraint mechanism disposed in the recessed portion of the base plate may have a tip end portion tapered so as to converge toward the body housing to restrain the rotation of the body housing at an arbitrary position.

The base plate may be provided with a movable pin to be inserted into an opening formed in a side surface of the body housing so as to restrain the rotation of the body housing.

The external teeth of the lock cap and the internal tooth-shaped grooves of the body housing may be formed of a hard material. The external teeth of the locking cap and the internal tooth-shaped grooves of the body housing may be composed of a rigid weld overlay material that does not contain cobalt.

According to the bolt fixing device of the jet pump beam according to the present invention, the inlet mixer of the jet pump can be attached or detached without performing a welding operation, and the rotation of the head bolt of the jet pump beam can be prevented, and the rotation prevention can be released easily only by a slide operation of the lock cap, and such operations can smoothly be performed simply and in a short time.

The nature and further characteristic features of the present invention will be made clearer from the following descriptions made with reference to the accompanying drawings.

DESCRIPTION OF THE PREFERRED EMBODIMENT

An embodiment of the present invention will be described hereunder with reference to the accompanying drawings. Further, it is to be noted that terms of "upper", "lower", "right", "left" and like terms are used herein with reference to the illustration of the drawings or in an actually locating state of a jet pump of a boiling water reactor.

Figure 1:
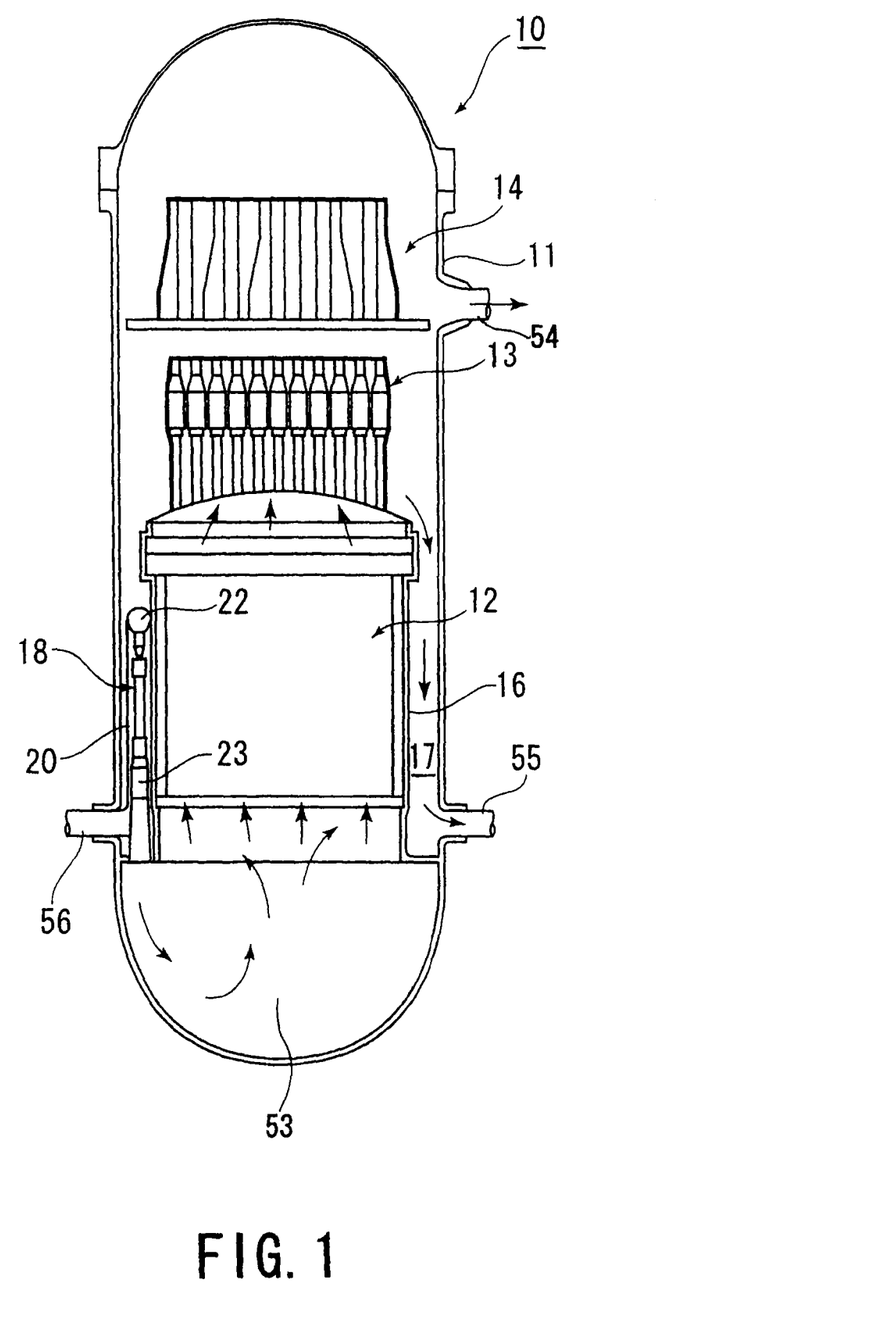
FIG. 1 is a longitudinal sectional view schematically illustrating a reactor pressure vessel of a boiling water reactor.

With reference to FIG. 1 showing a boiling water reactor including a jet pump with a bolt fixing device of a jet pump beam according to the present invention, a boiling water reactor 10 contains a reactor core 12 within a reactor pressure vessel 11, and a steam-water separator 13 and a steam dryer 14 are located in sequence above the reactor core 12.

The reactor core 12 is surrounded by a cylindrical core shroud 16. An annular downcomer portion 17 is formed between the core shroud 16 and the reactor pressure vessel 11. In the downcomer portion 17 in the reactor pressure vessel 11, a plurality of sets of jet pumps 18, e.g. 10 sets of jet pumps (total 20 jet pumps) are provided. The jet pump 18 is connected to an external reactor recirculation system, not shown, in the reactor pressure vessel 11 so as to forcibly feed a coolant into the reactor core 12, while passively reducing the flow rate of the coolant to be taken out into the external recirculation system.

Figure 2:
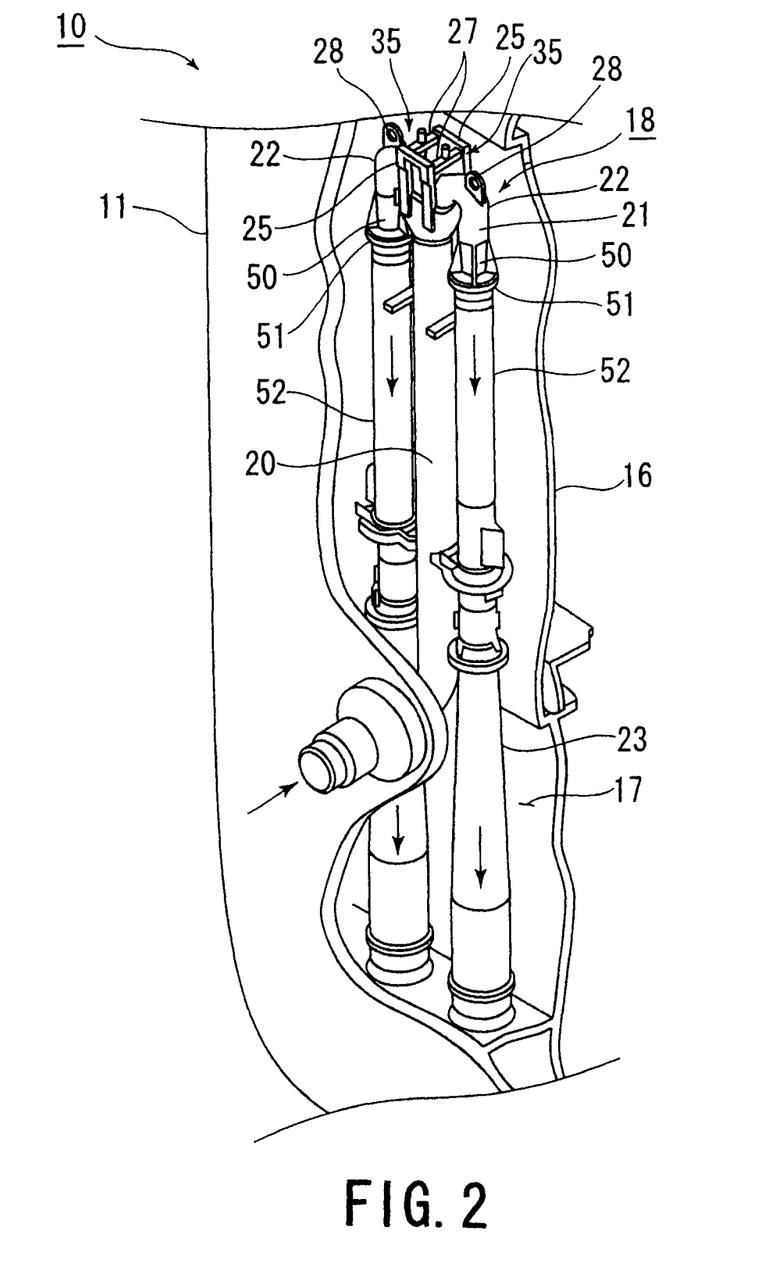
FIG. 2 is a perspective view of a jet pump located in a downcomer portion in the reactor pressure vessel.

The jet pump 18 has a riser 20 as a coolant supply pipe, a transition piece 21, a pair of inlet mixers 22 and diffusers 23 which constitute elbows. The transition piece 21 is formed integrally with an upper portion of the riser 20 and constitutes a bifurcated portion at a top portion of the riser 20.

Figure 3:
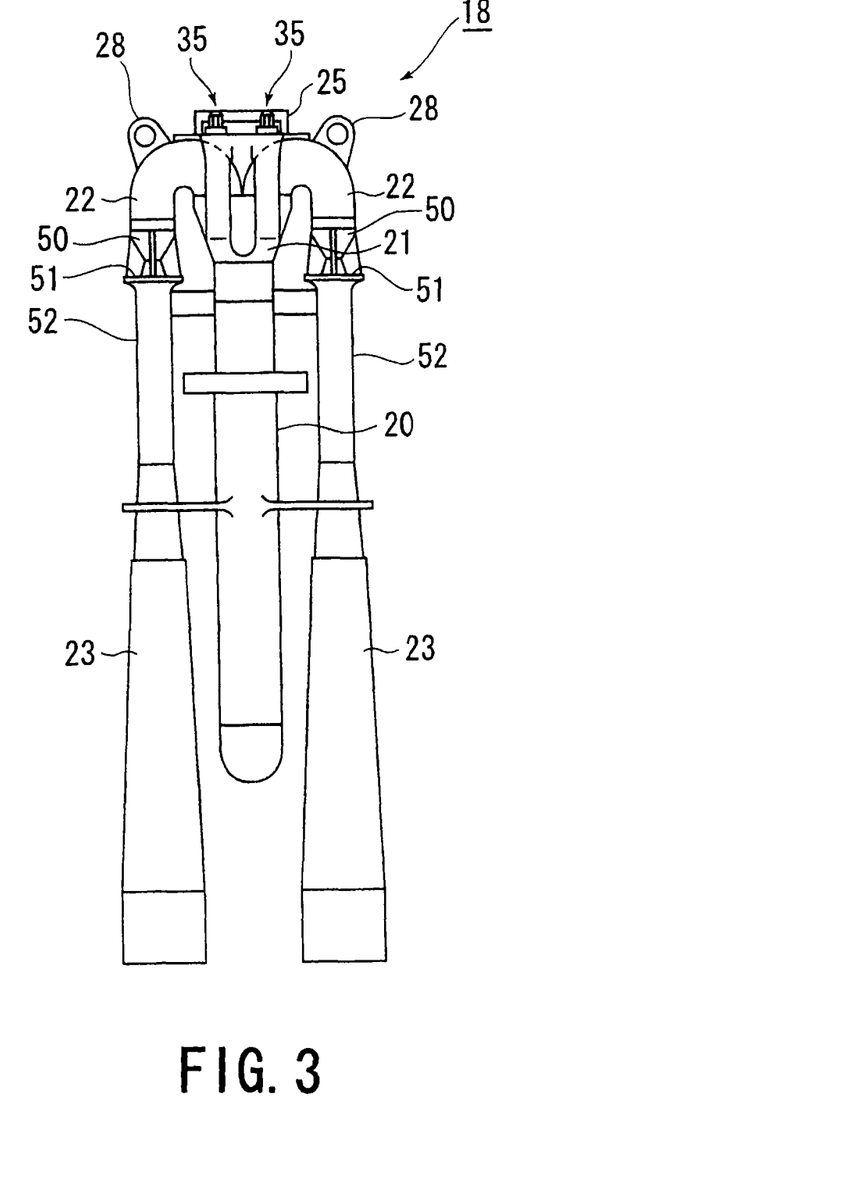
FIG. 3 is an elevational view of the jet pump.
Figure 4:
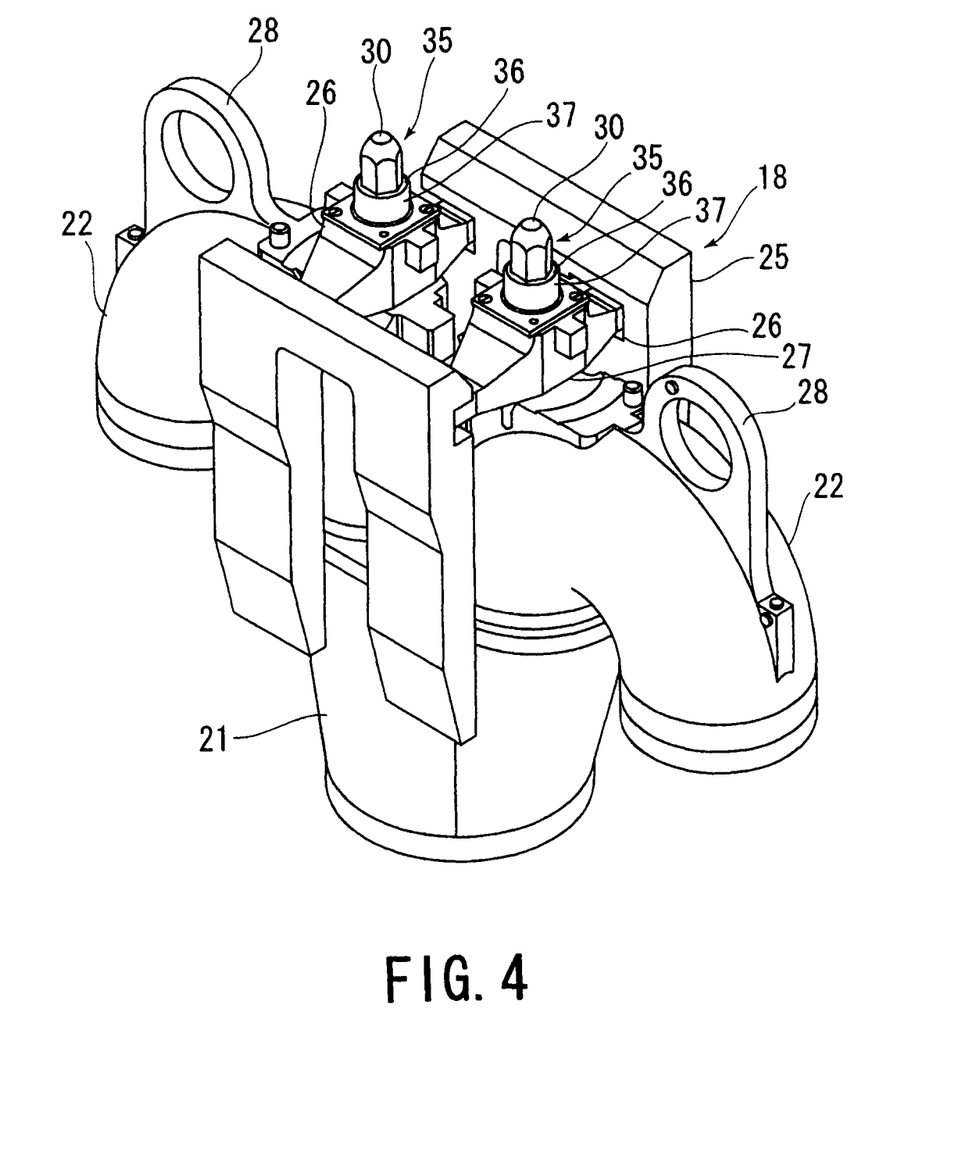
FIG. 4 is an enlarged perspective view explaining an upper portion of the jet pump.

As shown in FIGS. 3 and 4, the transition piece 21 is provided with a pair of transition piece posts 25, 25 on both sides of the bifurcated portion, so as to rise upwardly in an opposing manner, and the transition piece posts 25, 25 have ears-like shape. Pockets 26, 26 having an engaging slot-like shape are provided on the opposing inner surfaces of the pair of transition piece posts 25, 25. Both end portions of a jet pump beam 27, which is composed of a leaf spring member and is made of a nickel base alloy, are inserted into the pockets 26 and 26 and supported at the end portions, respectively.

In such a configuration, the jet pump beam 27 is substantially horizontally loaded (laterally bridged). The jet pump beam 27 pushes, contacts and supports, from the upper side, a top portion of the inlet mixer 22 forming the elbow. The inlet mixer 22 is mounted to a sealing surface of a two-pronged portion of the transition piece 21, thereby forming a turn-around path for coolant rising in the riser 20.

The jet pump beam 27 are in surface-contact, at its end portions, to upper end surfaces of pockets 26 and 26 and are engaged therewith in a supported state. Further, in FIGS. 3 and 4, reference numeral 28 denotes a hang bolt of the inlet mixer 22.

The jet pump beam 27 is formed, at its central portion, with a longitudinal screw hole 29 perpendicular to a beam axial direction and penetrating the jet pump beam 27 in the vertical direction. The head bolt 30 of a polygonal head bolt such as a hexagon head bolt is screwed into the screw hole 29. A male thread 31 of the head bolt 30 is screwed into the screw hole 29 of the jet pump beam 27. A tip end, i.e., lower end, of the head bolt 30 pushes and contacts the top of the inlet mixer 22 in a supported manner.

Figure 5:
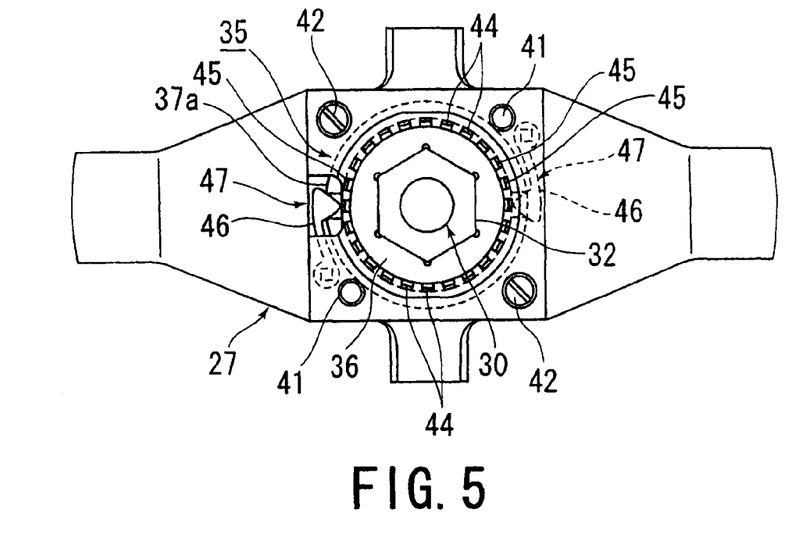
FIG. 5 is a plan view, partially cut away, illustrating one embodiment of a bolt fixing device of a jet pump beam according to the present invention.

The inlet mixer 22 is detachably installed on the transition piece 21 at the top portion of the riser 20 by a bolt fixing device 35 of the jet pump beam 27, which will be explained hereunder with reference to FIGS. 5 and 6.

Figure 6:
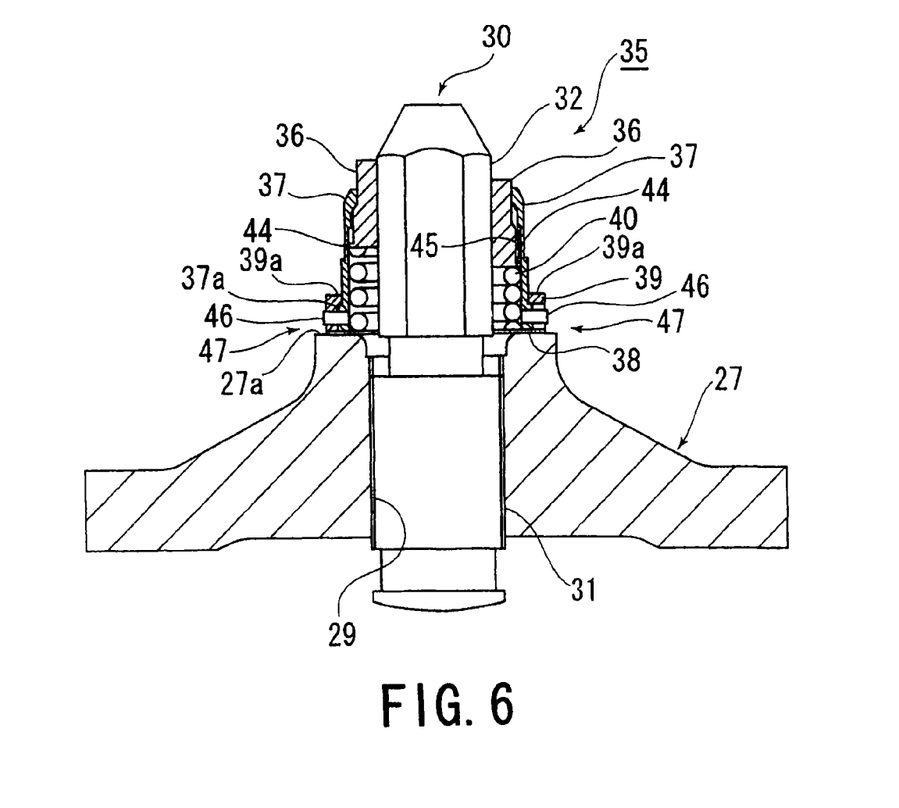
FIG. 6 is a cross-sectional view illustrating one embodiment of the bolt fixing device of the jet pump beam according to the present invention.

The bolt fixing device 35, as shown in FIG. 6, includes: the head bolt 30 screwed into the longitudinal screw hole 29 of the jet pump beam 27; a lock cap 36 fitted into a polygonal head portion 32 of the head bolt 30 to be integrally rotatable and slidable in its axial direction; a body housing 37 capable of accommodating the lock cap 36 selectively at a fixed position and at a freely rotatable position; a base plate 39 installing the body housing 37 to the top portion of the jet pump beam 27 via a collar 38 such as a washer; and a spring member 40 accommodated within the body housing 37 and urging the lock cap 36 to the upper integrally rotatable side. The base plate 39 is fixed to the upper surface 27a of the jet pump beam 27 by means of a positioning pin 41 and a small pin 42 such as a flat screw. The base plate 39 is provided with an inner peripheral flange 39a so as to push an outer peripheral flange 37a of the lower portion of the body housing 37 from the upper portion so as to cover the same.

Furthermore, in the bolt fixing device 35, the lock cap 36 fitting to the polygonal head portion 32 such as a hexagonal portion of the head bolt 30 is circumferentially provided with a plurality of tapered external teeth 44 which are expanded (sloped) downwardly on its outer peripheral portion. The internal tooth-shaped grooves 45 of the body housing 37 are selectively engaged with the external teeth 44. The external teeth 44 of the lock cap 36 are engaged with the internal tooth-shaped grooves 45 of the body housing 37 to be integrally rotatable when the lock cap 36 is moved upward to take a left side position of FIG. 6 as well as to be freely rotatable when the lock cap 36 takes a right side position of FIG. 6. An inner peripheral wall lower portion of the freely rotatable body housing 37 is formed so as to be flush in the same inner peripheral surface as a bottom of the internal tooth-shaped grooves 45.

The lock cap 36 and the body housing 37 are formed of a hard material such as nickel base alloy, and at least, the external teeth 44 of the lock cap 36 and the internal tooth-shaped grooves 45 of the body housing 37 may be formed of a hard material, and a rigid weld overlay material or a weld overlay material containing cobalt may be preferably used.

A bottom surface of the lock cap 36 is formed as a spring seat for receiving an elastic member (spring member) 40 such as a compression spring and a leaf spring. The lock cap is always spring-biased upwardly by the spring member 40 interposed between this spring seat and the collar (washer) 38 disposed on the upper surface 27a of the jet pump beam 27. By the urging force of the spring member 40, the external teeth 44 of the lock cap 36, as shown on the left half side of FIG. 6, is moved upward so as to be engaged with the internal tooth-shaped grooves 45 of the body housing 37, thereby restraining rotation of the head bolt 30 and preventing the rotation of the head bolt 30.

The bolt fixing device 35 compresses the lock cap 36 against the spring biasing force of the spring member 40, and therefore, the external teeth 44 of the locking cap 36 and the internal tooth-shaped grooves 45 of the body housing 37 are disengaged from each other so that the head bolt 30 is freely rotatable. Accordingly, the head bolt 30 is freely rotatable as shown on the right half side of FIG. 6.

Moreover, openings are formed in the opposing lower side surfaces of the body housing 37. By inserting a restraint spring 46 located in a recessed portion of the base plate 39 into the opening, the rotation of the body housing 37 about the axis thereof can be restrained. The restraint spring 46 constitutes a rotation restrain mechanism 47 of the body housing 37 in cooperation with the lower portion of the body housing 37 and the opening.

A front (upper) end of a restraint spring 46 inserted into the opening of the body housing 37 is formed so as to provide a tapered shape toward the body housing side. Therefore, the rotation restrain mechanism 47 of the body housing 37 can freely adjust the insertion amount of the restraint spring 46 into the opening 37a of the body housing 37, and can restrain the body housing 37 at any rotational position within a pitch angle range of the body housing opening. Moreover, the restraint spring 46 may be substituted with a movable restraint pin to be inserted into the opening of the body housing 37 as shown in FIG. 6.

With the bolt fixing device 35 of the jet pump beam 27, the rotation of the head bolt 30 can be prevented with the simple structure without performing a welding operation when the inlet mixer 22 is detached from the jet pump 18 or reinstalled on the jet pump 18. Furthermore, the fixing of the head bolt 30 to the jet pump beam 27 can be simply performed by engaging the external teeth 44 of the lock cap 36 with the internal tooth-shaped grooves 45 of the body housing 37. In addition, the unfixing of the head bolt 30 can be simply done by disengaging the external teeth 44 of the lock cap 36 from the internal tooth-shaped grooves 45 of the body housing 37 by only compressing the lock cap 36 against the spring biasing force of the spring member 40, and therefore, the lock cap 36 is made freely rotatable relative to the body housing 37 simply and easily. Fixing and unfixing of the head bolt 30 can be simply and easily performed only by the sliding operation of the lock cap 36 in an axial direction of the bolt.

In addition, when the inlet mixer 22 is detached and reinstalled, the head bolt 30 to the jet pump beam 27 is fixed without performing any welding operation. Moreover, the unfixing of the head bolt 30 can simply be performed by sliding the lock cap 36. Further, since the tapered external teeth 44 of the locking cap 36 are engaged with the internal tooth-shaped grooves 45 of the body housing 37 so as to minimize clearance or the like and disengagement thereof can be performed smoothly according to the operations mentioned above, the head bolt 30 can be fixed and unfixed only by moving the lock cap 36 up and down, thus easily and smoothly preventing the head bolt 30 from rotating or being released for rotation.

Accordingly, in the bolt fixing device 35 of the jet pump beam 27 of the present embodiment, the inlet mixer 22 is installed on a seat surface of the transition piece 21 in the upper portion of the jet pump riser 20 in a manner pushed and supported by the bolt fixing device 35 by utilizing the jet pump beam 27. In the jet pump 18, the coolant rising through the riser 20 is guided to the pair of elbow-shaped inlet mixers 22 which are bifurcated at the transition piece 21.

In the inlet mixer 22, the coolant is turned around and ejected downward from jet pump nozzles 50 on both outsides toward inlet port 51s of mixing chambers 52 as shown in FIG. 3. When the coolant is ejected from the jet pump nozzle 50 as a high speed ejection fluid (driving fluid), as shown in FIG. 1, saturated water (coolant) separated through the steam-water separator 13 and the steam dryer 14 in the reactor core upper portion is involved in the downcomer portion 17 and sucked from a low-pressure area caused at the outlet of each of the jet pump nozzles 50 into each of the jet pump inlet port 51. After the driving fluid and suction fluid (driven gas) are sufficiently mixed in the mixing chamber 52, the driving fluid and suction fluid restore their pressure in the diffuser and is then sent to a reactor core lower plenum 53.

The coolant flowing out of the jet pump 18 is turned around in the reactor core lower plenum 53, is led to the reactor core 12, is heated while passing through the reactor core 12 to result in a two-phase flow of air-water mixture, rises upward, is sent to the steam-water separator 13 to be separated, is subsequently sent to the steam dryer 14 for drying, and then, is sent from a main steam outlet 54 to a steam turbine, not shown.

Moreover, a part of the saturated water guided to the downcomer portion 17 is moved downward through the downcomer portion 17 and is removed from the outlet nozzle 55 to two series of recirculation loops, and the pressure thereof is then increased by a recirculation pump, not shown. After the pressure is increased by operation of the recirculation pump, the saturated water is sent from the recirculation inlet nozzle 56 of the jet pump 18 to the riser 20, rises upward in the riser 20, and is ejected again from the jet pump nozzle 50 of the inlet mixer 22.

Accordingly, in the bolt fixing device 35 of the jet pump beam 27 of the present invention, when the inlet mixer 22 located in the jet pump 18 is installed, fixing (rotation prevention) and unfixing of the head bolt 30 to the jet pump beam 27 can be performed simply and in a short time only by the slide motion of the lock cap 36 without performing any welding working.

It is further to be noted that the present invention is not limited to the described embodiment and many other changes and modifications may be made without departing from the scopes of the appended claims.

What is claimed is:
1. A bolt fixing device for a jet pump of a boiling water reactor, comprising:
   a jet pump beam formed with a screw hole penetrating the jet pump beam at a central position thereof;
   a rotatable head bolt having a polygonal head portion, the head bolt being screwed into the screw hole of the jet pump beam;

a lock cap provided on the polygonal head portion of the head bolt, the lock cap being rotatable together with the head bolt and slidable in an axial direction of the polygonal head portion;

a body housing disposed on an upper surface of the jet pump beam accommodating the lock cap;

a plurality of external teeth which are formed to expand downwardly on an outer peripheral side surface of the lock cap;

a plurality of internal tooth-shaped grooves which are formed to the body housing and selectively engaged with the external teeth of the lock cap to thereby fix the head bolt of the jet pump beam; and an elastic member, interposed between the upper surface of the jet pump beam and the lower surface of the lock cap, that urges the lock cap and the external teeth thereof upward so as to be engaged with the internal tooth-shaped grooves of the body housing, thereby preventing rotation of the head bolt, the lock cap and external teeth being disengaged from the internal tooth-shaped grooves when the lock cap is compressed against an urging force of the elastic member.

2. The bolt fixing device of the jet pump beam according to claim 1, wherein the elastic member is a compression spring or a leaf spring.

3. The bolt fixing device of the jet pump beam according to claim 1, wherein the body housing is provided with an outer peripheral flange at a lower portion thereof, the outer peripheral flange being fixed to an upper surface of the jet pump beam by a base plate having an inner peripheral flange, and the body housing includes a rotation restraint mechanism mounted to the base plate.

4. The bolt fixing device of the jet pump beam according to claim 3, wherein the rotation restraint mechanism of the body housing includes a restraint spring disposed in a recessed portion of the base plate and a housing opening opened in an outer side surface of the body housing so as to be engageable with the restraint spring, and rotation of the body housing is restrained at an arbitrary position within a pitch angle range of the housing opening.

5. The bolt fixing device of the jet pump beam according to claim 4, wherein the restraint spring of the rotation restraint mechanism disposed in the recessed portion of the base plate has a tip end portion tapered so as to converge toward the body housing to restrain the rotation of the body housing at an arbitrary position.

6. The bolt fixing device of the jet pump beam according to claim 3, wherein the base plate is provided with a movable pin to be inserted into an opening formed in a side surface of the body housing so as to restrain the rotation of the body housing.

7. The bolt fixing device of the jet pump beam according to claim 1, wherein the external teeth of the lock cap and the internal tooth-shaped grooves of the body housing are formed of a nickel base alloy.

8. The bolt fixing device of the jet pump beam according to claim 1, wherein the external teeth of the locking cap and the internal tooth-shaped grooves of the body housing are composed of a rigid weld overlay material that does not contain cobalt.

\* \* \* \* \*